United States Patent [19]

Johnston et al.

[11] 4,400,688

[45] Aug. 23, 1983

[54] METHOD AND APPARATUS FOR COMMUNICATION OVER ELECTRIC POWER LINES

[75] Inventors: Reed H. Johnston, Wellesley; Dennis C. Jeffreys, Bedford; Lawrence J. Stratton, Lexington; Albert W. Welz, Jr., Westford, all of Mass.

[73] Assignee: New England Power Service Company, Westborough, Mass.

[21] Appl. No.: 197,043

[22] Filed: Oct. 15, 1980

Related U.S. Application Data

[63] Continuation of Ser. No. 64,139, Aug. 6, 1979, abandoned, which is a continuation of Ser. No. 649,843, Jan. 16, 1976, abandoned.

[51] Int. Cl.³ ............................................... H04B 3/54
[52] U.S. Cl. .................. 340/310 R; 307/140; 340/310 A
[58] Field of Search ........ 340/310 R, 310 A, 310 CP, 340/825.06; 332/9 R; 455/352, 344, 282, 55, 14, 108, 110; 375/36; 307/3, 140

[56] References Cited

U.S. PATENT DOCUMENTS

| | | | |
|---|---|---|---|
| 3,445,814 | 5/1969 | Spalti | 340/310 R |
| 3,458,657 | 7/1969 | Lestek et al. | 340/310 A |
| 3,460,121 | 8/1969 | Wattenburg | 340/310 A |
| 3,462,756 | 8/1969 | Mills | 340/310 R |
| 3,488,517 | 1/1970 | Cowan et al. | 340/310 A |
| 3,509,537 | 4/1970 | Haberly | 340/310 A |
| 3,714,451 | 1/1973 | Whitney et al. | 340/310 R |
| 3,721,830 | 3/1973 | Oishi et al. | 340/310 R |
| 3,733,586 | 5/1973 | Lusk et al. | 340/310 R |
| 3,818,466 | 6/1974 | Honda | 340/310 A |

*Primary Examiner*—James J. Groody
*Attorney, Agent, or Firm*—Richard J. Birch

[57] ABSTRACT

A method and an apparatus for communicating over electric power lines in a direction from load to source is disclosed. The power line voltage wave is loaded in a predetermined pattern to produce a corresponding pattern of signaling currents at a receiving site. Detection of the signaling current is accomplished in the preferred embodiment by integrating the current in the phase or the neutral of the feeder that serves the signaling site during predetermined time windows which are synchronized with the power line voltage wave. The current integration is performed in accordance with a detection algorithm to accumulate principally the current differences that are attributable to the signaling currents while in the presence of steady and transient currents on the feeder.

19 Claims, 13 Drawing Figures

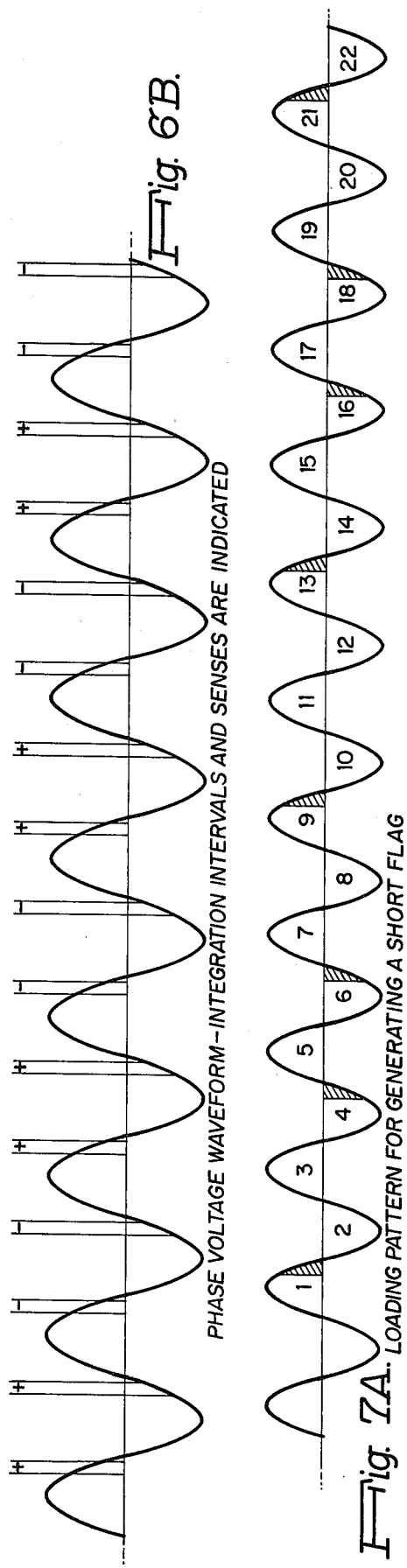

METHOD AND APPARATUS FOR COMMUNICATION OVER ELECTRIC POWER LINES

CROSS REFERENCE TO RELATED APPLICATION

The present application is a continuation application of Ser. No. 064,139 filed Aug. 6, 1979, now abandoned, which is a continuation application of Ser. No. 649,843 filed Jan. 16, 1976, now abandoned.

BACKGROUND OF THE INVENTION

The present invention relates to communication systems and more particularly to a method and apparatus for communicating over electric power lines in a direction from load to source.

The use of electric power lines for signaling to convey information from a point of consumption to a point more centrally located with respect to the source of electrical energy is well known in the art. Representative examples of schemes proposed for communicating intelligence in the direction from load to source i.e. in an "inbound" direction are described in the following U.S. patent:

(1) U.S. Pat. No. 3,509,537, issued Apr. 28, 1970 to C. F. Haberly, for "Digital Communication Apparatus For A Power Distribution Line"—in which a signaling load is alternately impressed on and removed from the line at a frequency that is a subharmonic of the line frequency; the current modulation thereby produced contains frequencies not normally present in the line and the signal is sensed by selectively detecting such frequencies in the phase current at the central power station, (2) U.S. Pat. No. 3,258,692 issued June 28, 1966 to O. J. Jacomini et al, for "Automatic Reading Apparatus For Plural Meters By Transmitted Coded Pulse Trains'-'—in which a passive load is or is not impressed as an additional load at the customer's premises at a 30 hertz rate according as the bit to be transmitted as a one or a zero; a 30 hertz filter is used to extract the intelligence.

(3) U.S. Pat. No. 3,733,586 issued May 15, 1973 to J. F. Lusk et al, for "Meter Interrogation System Having Strobe Logic Control"—in which frequency shift keying is used at frequencies sufficiently high that multipath time dispersal must be considered (typically 900 Hz and 1100 Hz).

(4) U.S. Pat. No. 3,445,814 issued May 20, 1969 to A. Spaltil, for "System For Interrogating Remote Stations Via Power Lines of An Electrical Distribution Network"—in which a series-resonant circuit with time constant short relative to the period of the line excitation is shorted across the power line near the crest of the voltage wave; the polarilty of the voltage wave is opposite on successive applications and the interval between successive applications is a characteristic of the bit to be transmitted. Information is extracted at the district receiver station based on the electrically distinguishable characteristics of the individual pulses from different transmitting sites and on the intervals between successive pulses.

(5) U.S. Pat. No. 3,460,121 issued Aug. 5, 1969 to W. H. Wattenburg et al, for "Signaling and Communication System"—in which signaling is accomplished by means of a dynamic load which is impressed on the power line voltage; the nature of this dynamic load is such that during signaling the load is continuously switched on and off electronically at a frequency harmonically related to the power line frequency by means of internal control circuitry.

Additionally, recent work has been reported by Automated Technology Corporation, by General Electric Company and by Westinghouse Electric Corporation, in which communication over power distribution lines is accomplished at frequencies of the order of 100 kHz at which frequency the signals traverse the distribution transformers by virtue of the capacitance between primary and secondary windings. In these programs the scheme of Automated Technology Corporation utilizes frequency shift keying to frequencies on opposite sides of a mid frequency to represent ones and zeros, while the General Electric Company utilizes on-off keying of a central frequency.

The above mentioned approaches tend to suffer from one or more of a variety of difficulties. The high frequency schemes experience excessive attenuation on traversing distribution transformers; this attenuation depends somewhat upon the design of the transformer but can easily amount to 20 to 30 decibels. Power factor correcting capacitors tend to absorb the high frequency components and thus act detrimentally on all schemes that depend upon the transmission of frequency components appreciably above that of the power supply frequency. Schemes that employ loading at subharmonic frequencies tend to suffer from very low signal rates in that several cycles must be sensed in order to achieve a narrow bandwidth—and if the bandwidth is not narrow then the signal-to-noise ratio suffers. When narrow band receivers are required for frequencies generated by subharmonic loading of the power line voltage there arises the additional problem of ensuring that the frequency band correctly tracks the changes in frequency that are attributable to drift of the instantaneous frequency of the power system—though this problem may not arise in the case of receivers of affordable cost for low frequency reception.

It is a general object of the present invention to provide a method and apparatus for central power line communication which overcome the various disadvantages of the earlier approaches to communication over power lines in the inbound direction.

It is specific object of the present invention to provide a method for electric power line communication which utilizes a signal waveform that approaches closely the waveform for which the electrical distribution system was designed.

It is another object of the present invention to generate a signal current by impressing loads on the line voltage by means of silicon controlled rectifiers (SCR) or triacs employed as switches in a duty cycle which permits the high transient current capability of SCR's or triacs to be exploited without also causing substantial thermal dissipation.

It is a feature of the invention that high peak signal power levels can be achieved while maintaining low average power dissipation without incurring excessive costs through the use of SCR's or triacs as the switching element.

It is another feature of the present invention that the high power signaling can be accomplished without introducing noticable flicker on lighting loads on the customers premises and without interfering with the operation of television sets or other voltage sensitive apparatus.

It is a further feature of the present invention that detection is accomplished in a fashion which selectively accumulates valid signal while discriminating against all currents attributable to steady loads or transient switching.

It is still another feature of the present invention that simultaneous noninterfering inbound transmissions can be superimposed on the same phase.

It is an additional feature of the present invention that detection is accomplished in processing relatively few cycles of the current wave.

It is a further feature of the invention that the inbound transmissions occur on individual phases of the power system and accordingly simultaneous inbound transmissions on the multiple phases is achievable.

It is another feature of the invention that priority messages can be detected in the presence of other messages.

These objects and other objects and features of the present invention will best be understood from a detailed description of preferred embodiments thereof, selected for illustration and depicted in the accompanying drawings, in which:

FIG. 1A illustrates a two-cycle signal pattern shown with respect to the electric power line voltage wave. Resistive loading is applied late in a half-cycle of positive polarity to represent a "zero" or a "one". Signaling current is generated during the shaded portions of the voltage wave. The relevant detection algorithm is depicted beneath the voltage wave.

Figure 1A:
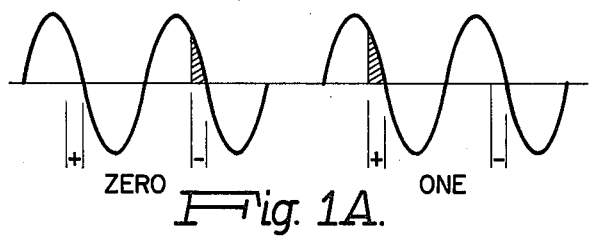
FIG. 1B illustrates another two-cycle pattern in which resistive loading is applied late in a half-cycle of negative polarity to represent a "zero" or a "one".
FIG. 1C illustrates the combination of the loading patterns and detection algorithms of FIGS. 1A and 1B to form a two-cycle signal pattern in which resistive loading is applied late in half-cycles of each polarity for the representation of a "zero" or a "one" with twice the signal.
Figure 2A:
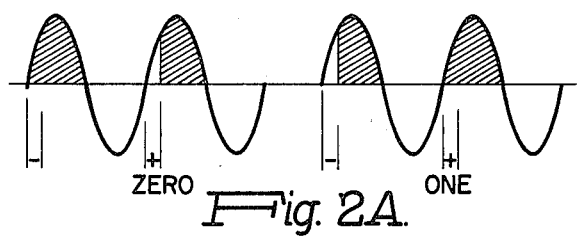
Figure 1B:
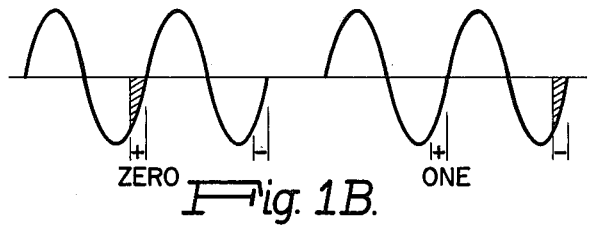

FIG. 2A illustrates another two-cycle signal pattern shown with respect to the electric power line voltage wave. Resistive loading is applied early in each half-cycle of positive polarity to represent a "zero" or a "one". The shaded portions depict the time during which signaling current is generated and the corresponding detection algorithm is shown below the waveform.

Figure 2B:
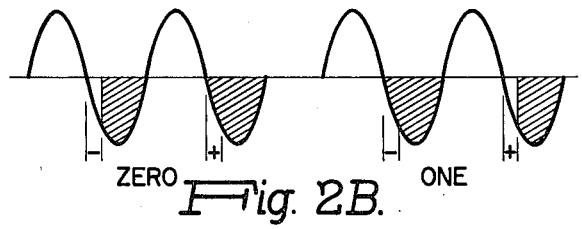

FIG. 2B illustrates another two-cycle signal pattern in which resistive loading is applied early in each half-cycle of negative polarity to represent a "zero" or a "one".

Figure 2C:
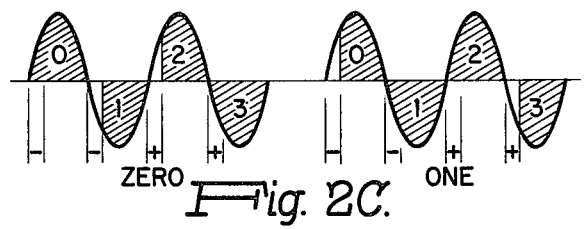

FIG. 2C illustrates the combination of the loading patterns and detection algorithms of FIGS. 2A and 2B to form two-cycle signal patterns in which resistive loading applied early in each half-cycle to represent a "zero" or a "one" with twice the signal.

Figure 3:
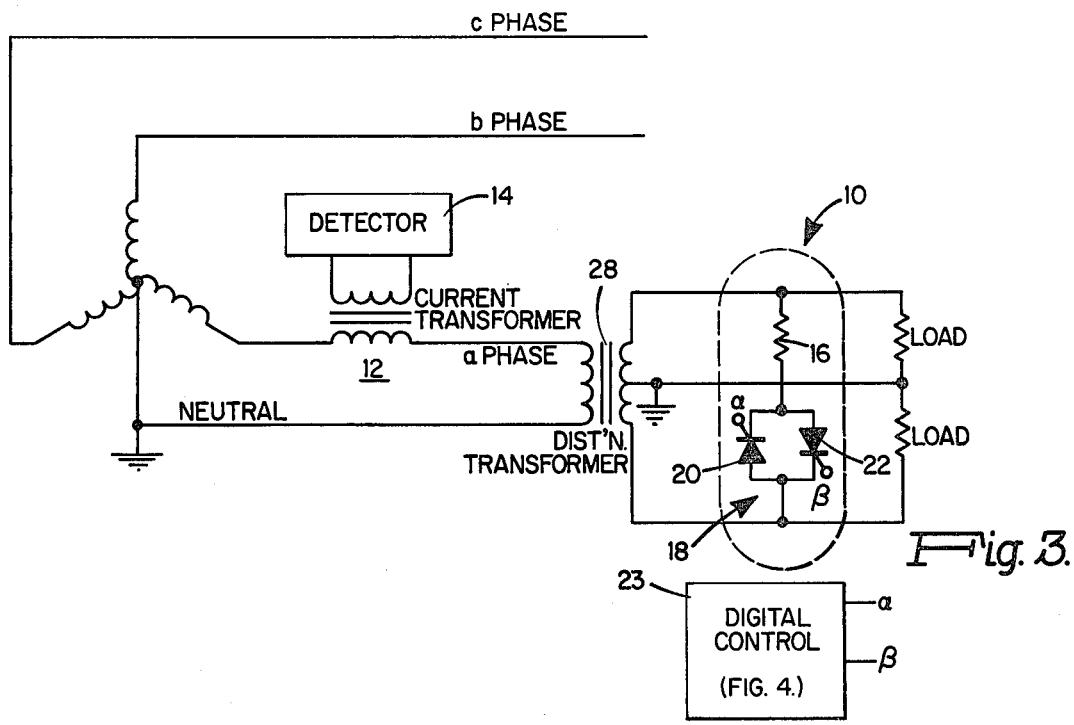

FIG. 3 depicts in block and partial schematic form a three-phase electric distribution system with the signal current generating means of the present invention connected across the secondary of the distribution transformer.

Figure 4:
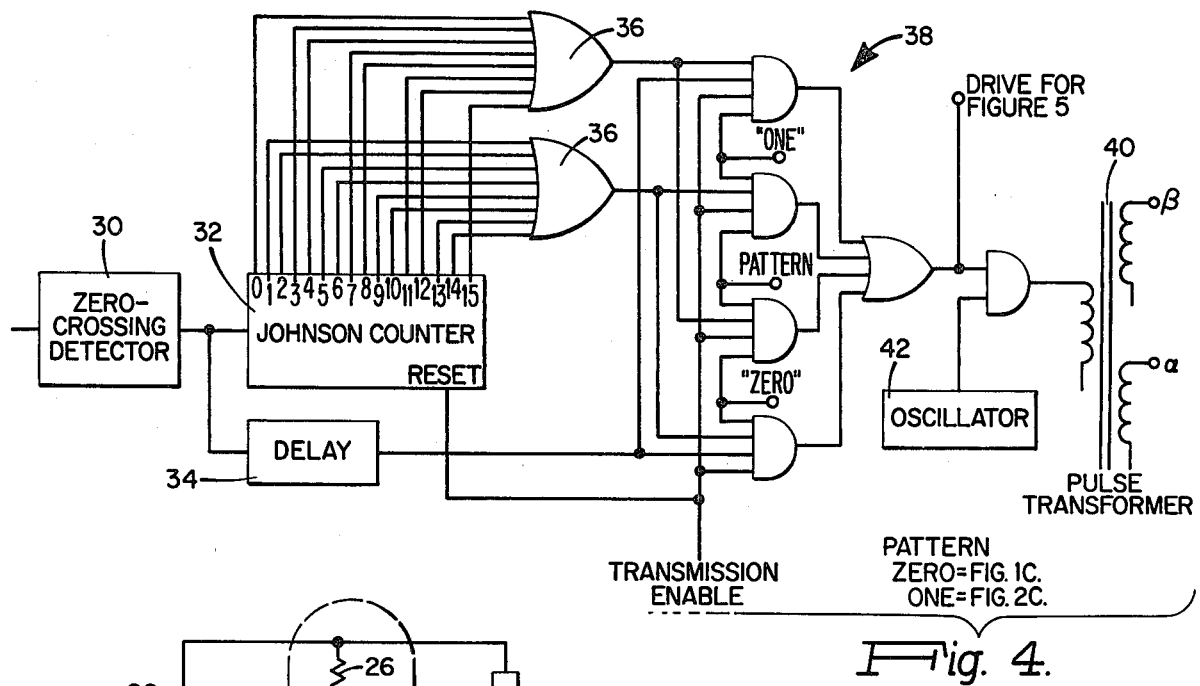

FIG. 3A depicts a portion of the circuit of FIG. 3 showing a capacitive load for the signal current generating means;

FIG. 3B depicts a portion of the circuit of FIG. 3 showing a capacitive load with precharging for the signal current generating means;

FIG. 3C depicts a portion of the circuit of FIG. 3 showing an inductive load for the signal generating means;

FIG. 4 depicts in block form the digital control logic for controlling the signal current generating means illustrated in FIG. 3.

Figure 5:
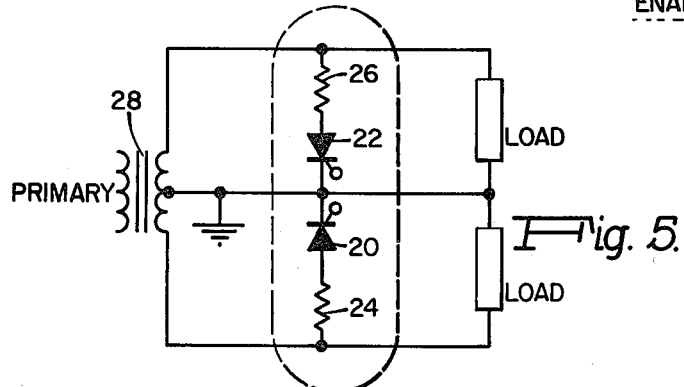

FIG. 5 illustrates another emboidment for the signal current generating means shown within the dashed lines of FIG. 3.

Figure 6A:
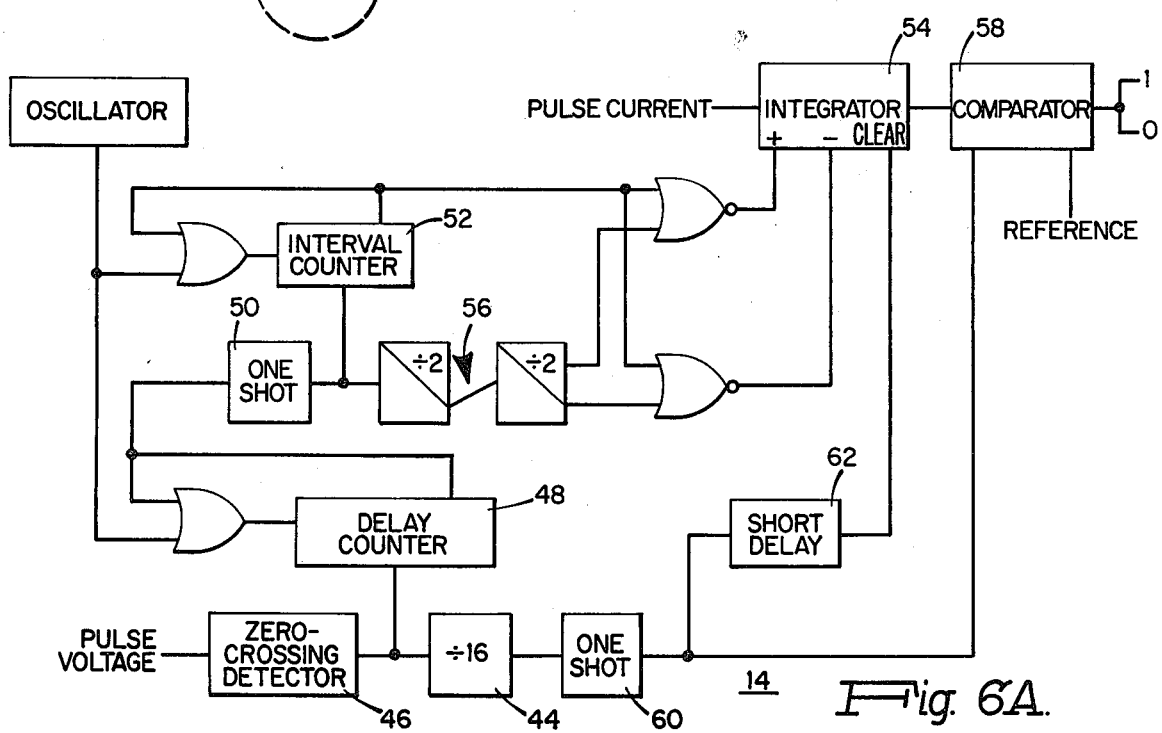

FIG. 6A illustrates in block form a detector for implementing the detection algorithms shown in FIGS. 1A through 1C and 2A through 2C when the signal patterns are replicated four times.

FIG. 6B illustrates the phase voltage waveform together with the corresponding integration intervals and senses.

FIG. 7A illustrates another signal current pattern shown with respect to the electric power line voltage wave with signal current flowing during the shaded portions of the voltage wave. This pattern is illustrative of a signal pattern for the asynchronous embodiment of the invention; and, FIG. 7B illustrates the operation of the detection algorithm for the signal current pattern depected in FIG. 7A.

The method and apparatus of the present invention can best be understood by referring to the above-mentioned drawings in connection with the following detailed description of the preferred embodiments thereof.

The communication system of the present invention can be used for the transmission of all types of digital data in the inbound direction. The transmission of meter readings for billing and/or consumption analysis are two possible uses for the signaling system. The invention is well-suited to the communication of information relating to the efficient operation of the utility system. Information falling within this category would include voltage levels, phase angles, transformer temperatures, status of capacitor banks and similar operational information. Furthermore, the data need not be limited to information of direct concern to the electric utility but can include meter readings for other utility systems and emergency signaling relating to fires, excess boiler pressure, intrusion, temperature, low water level or other abnormal circumstance.

CONCEPTUAL ASPECTS

The present invention utilizes a signaling current pattern that is superimposed on the phase current that supplies the normal loads on that phase. The signaling current pattern is produced by adding signaling current, such as, by switching a load, resistive, capacitive or inductive on and off the phase in synchronization with respect to the voltage wave on that phase, e.g., 400 Hz, 60 Hz, or 50 Hz (hereafter referred to as 60 Hz for purposes of convenience). The term "adding" as used herein denotes the creation of the signaling current pattern through the electrical connection or disconnection of a load. The term "power line voltage wave", as used herein, shall mean the power line voltage wave per se and any wave whose frequency is a rational multiple of the power line frequency and has a zero-crossing which is temporarily related to a specific zero-crossing of the power line voltage wave per se. The preferred signaling pattern comprises two separate current pulses the leading edges of which are spaced apart by at least 90° and are normally located within two cycles of the power line voltage wave.

Detection of the signal current pattern is accomplished in the preferred embodiment by integrating the current in the phase that serves the signal receiving site during predetermined time windows that are synchronized with the power line voltage wave. For the preferred signaling pattern, comparison is performed between the currents occurring during at least a portion of each of two half-cycles of the power line voltage wave which are spaced apart by at least a full cycle of the voltage wave. The current integration is performed in accordance with a detection algorithm to accumulate the current differences that are attributable to the signaling currents while in the presence of steady and transient service loads.

It should be noted that if the normal half-cycle current wave on a particular phase were symmetrical in its rise and fall portions, more compressed signaling patterns could be employed and the detection could be accomplished by comparing intervals specified with respect to the symmetry; by this means patterns occupying less than one half period of 60 Hz could be recognized.

Referring now to the signaling current patterns shown in FIGS. 1A through 1C and 2A through 2C, binary "Ones" and "Zeros" (bits) are represented by patterns of resistive loading which produce corresponding signal current patterns as shown in these Figures. Signal current flows during the shaded portion of the illustrated power line voltage wave. The resistive loading and the corresponding signal currents are synchronized with respect to the phase of the power line voltage wave.

Comparison of the signal currents, if any, during corresponding portions of two half-cycles of the power line voltage wave is performed in accordance with the depicted detection algorithm and during the illustrated times. Although only two cycles have been shown in these Figures, preferably the pattern is repeated a number of times e.g. four, in order to improve the assurity of detection. In addition, in these Figures, the pair of cyles to be compared are successive and the specific half-cycles containing the signal pattern, if any, are spaced apart by a full cycle of the power line voltage wave. Although this configuration is convenient in terms of implementation, the pair of cycles containing the signal current information half-cycles do not have to be successive provided that a mutually agreed convention is observed at the signaling site and at the detection site. In this case, it will be appreciated that the comparison half-cycles will be spaced apart by more than one cycle of the voltage wave. It should be noted that the preferred detection algorithms treat alternate cycles in the opposite sense; thus if the initiation of the detection algorithm were displaced by one cycle, the sign of the signal accumulated in the detection of a bit would be reversed.

The present invention is distinguishable from earlier practice in that it employs two levels of synchronization with the 60 Hz wave in order that the detected signal produce an intelligible message. At one level of synchronization the detection process is implemented in a specific phase relationship relative to the 60 Hz wave; this is a common practice in prior art. The second level of synchronization requires that a specific cycle of the 60 Hz wave be acknowledged by both transmitter and receiver to be a reference cycle (which may or may not be part of the message).

This second level of synchronism, not practiced in prior art, determines the sense in which the inbound signal will be accumulated in the detection process. Through this second level of synchronization one is able to substitute for the frequent practice of merely detecting the presence or absence of signal, the improved practice of detecting signal in two intelligible senses and thereby accomplishing an improvement in the signal detectability relative to that realized by merely sensing whether the signal is present or absent.

One can also view the detection of two types of signal and the recognition of the absence of signal as comprising the potential of a ternary code in contrast to the binary coding that is possible in the established art.

Detection of the signal currents depicted in FIGS. 1A-1C and 2A-2C is accomplished in the preferred embodiment by integrating the phase current at the substation or other detection site in accordance with the detection algorithms. The detection algorithms which indicate the intervals over which integration is performed and the sense in which the integral is accumulated are shown below the voltage wave in the Figures for each pair of cycles. If the basic bit pattern is repeated a number of times in order to improve signal detectability, then the integrator is not cleared between successive pairs of cycles but rather it is cleared only at the end of the detection algorithm.

It will be noted that in the first pair of cycles the signal representing a "zero" contributes to the integral only in the half sinusoids designated 1 and 2; likewise the signal representing a "one" contributes to the integral only in the half sinusoids designated 0 and 3.

Adopting the convention that integration in the (+) sense results in increase in the integral when the signal loading occurs in a region where the voltage wave of the Figures lie above the axis, one recognizes that detection of a "zero" produces a negative signal in the integrator while detection of a "one" produces a positive signal.

The signals resulting from the application of the detection algorithms during each of the pairs of cycles that comprise each bit portrayed in these Figures are accumulated in an integrator. At the end of each detection algorithm the signal then in the integrator is compared with a threshold; a "one" or a "zero" is acknowledged when, in this comparison, the signal is found to exceed the threshold in the positive or negative sense. Following comparison the integrator is cleared in readiness for the next detection algorithm. In a ternary system, two thresholds are employed to define three regions.

A single outbound message via the power line or a separate communication channel can elicit response from a succession of inbound transmitters located at one or a number of signaling sites. A request for meter readings from a succession of sites might be sought in an instance where meter readings are needed for routine billing purposes. It is possible to schedule successive messages so as to avoid overlapping of adjacent messages and yet have no unused cycles between messages. The means by which such scheduling is accomplished will be discussed subsequently. The fact that this is accomplished in cases where a succession of transmissions are elicited by a single outbound interrogation is indicated in FIG. 4, by a signal designated "transmission enable". It should also be noted that the signal patterns of FIGS. 1A-1C and 2A-2C are transparent to each other and thereby afford a means for simultaneous transmission of different messages.

THE PREFERRED EMBODIMENT

FIG. 3 depicts the general configuration of the signaling apparatus 10 within the electric distribution feeder indicated generally by the reference numeral 12. The various signaling transmitters may initially be locked in synchronism among themselves and with the receiver (detector) 14 in response to an outbound message (the facility for which is not depicted in FIG. 3) which elicits the inbound transmissions. This synchronization in response to the outbound message provides the second level of synchronization needed to impart the intelligence and additionally allows the successive transmissions to be correctly scheduled so as to transmit in a nonoverlapping pattern at times that will be precisely known at the receiving station. In the absence of such second level synchronization achieved through an outboard transmission, a plurality of detectors 14 can be employed to operate at different synchronizations. This arrangement is discussed below in greater detail.

In FIG. 3 the transmitter 10 proper is depicted within an area enclosed in dashes. The transmitter comprises a resistive load 16 and a switch indicated generally as 18. In FIG. 3, switch 18 is depicted as anti-parallel silicon controlled rectifiers 20 and 22. The silicon controlled rectifiers are gated by signals designated $\alpha$ and $\beta$ which are derived from a digital control circuit 23 shown in detail in FIG. 4. The digital control logic 23 generates gating signals for the SCR which produce a loading pattern conforming to the bit pattern convention of FIGS. 1A-1C and/or FIGS. 2A-2C and the binary content of the message.

It has been mentioned previously that the load that is switched on and off the phrase can be resistive, capacitive or inductive. FIG. 3 illustrates the resistive load in the form of resistor 16. FIG. 3A depicts a capacitive load provided by capacitor 16a. FIG. 3B illustrates an alternative embodiment of the capacitive load in which capacitor 16a is precharged by precharging circuit 17. Firing of the precharged capacitor 16a is controlled by an SCR control 19 which triggers the SCRs 20 and 22 (included within control 19) at the peak voltage to which capacitor 16a has been charged. FIG. 3C shows an inductive load provided by inductor 16b.

An alternative embodiment of the transmitter 10 is depicted in FIG. 5. In this configuration two resistors 24 and 26 are used instead of the single resistor 16 shown in FIG. 3. One advantage of the configuration shown in FIG. 5 lies in the fact that the silicon controlled rectifiers can be controlled without potential isolation. Additionally it should be noted that the inverse voltage rating of the silicon controlled rectifiers in FIG. 5 need be only half that required in transmitter 10 of FIG. 3. Notice that in both FIGS. 3 and 5 the transmitter 10 is located on the secondary side of the distribution transformer 28 that serves the signaling site.

Figure 1C:
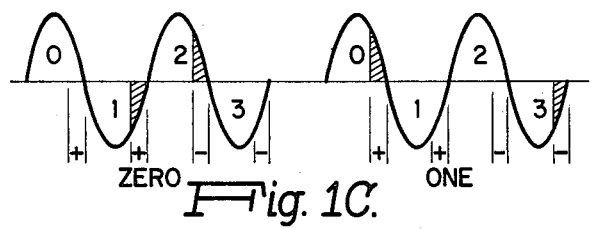

The gating signals that control the firings of the silicon controlled rectifiers of the transmitters depicted in FIGS. 3 and 5 are generated by suitable digital control logic, such as, that depicted in FIG. 4 which pertains to patterns such as those in FIGS. 1C or 2C replicated four times. Referring for a moment to FIG. 1C it will be noted that the partial-half-sinusoidal loading occurs during half-sinusoids 1 and 2 in the representation of a "zero" and during half-sinusoids 0 and 3, in the representation of a "one". Returning to FIG. 4, zero-crossing detector 30 produces a pulse on each zero-crossing of the voltage wave. This pulse is counted directly into a Johnson counter 32 and it is also used to activate a delay circuit 34 which determines the delay between the zero-crossing and the onset of the partial-half-sinusoidal loading. The Johnson counter is reset on the synchronizing signal derived from the outboard interrogating message; this is the second level of synchronization that permits the intelligence to be conveyed. The decoded counts of the Johnson counter are combined in a pair of OR gates 36 to determine the combination of half-sinusoids in which partial-half-sinusoidal loading is to occur in signaling "zeros" and in signalling "ones; in the other half-sinusoids there is no loading in the pattern of FIG. 1C. Note that in the other half-sinusoids there is continuous loading in the alternative pattern of FIG. 2C.

And AND/OR composite gate indicated generally as 38 combines the delay signal with the output of the OR gates from the Johnson counter, with the transmission enable signal and with the "one" or "zero" of the message to determine when the partial-half-sinusoidal loading is to be initiated. The composite AND/OR gate also provides for either no loading or for continuous loading during the half-sinusoid where partial-half-sinusoidal loading does not occur, according to the pattern of FIG. 1C or 2C as desired. The output of composite AND/OR gate 38 can be used without isolation (but through buffering which is not shown) to control the firing of the circuit depicted in FIG. 5. Potential isolation (and buffering) is employed if the transmitter of FIG. 3 is employed. The isolation is depicted in FIG. 4 in the form of a pulse transformer 40. An oscillator 42 provides continuous triggering via the pulse transformer.

The major elements of the detector 14 are depicted in FIG. 6A for detecting the signal pattern of FIG. 1C or 2C replicated, four times. In this circuit a "divide-by-sixteen" element 44 is depicted; this is a four stage binary counter which is reset on the same second level synchronizing signal of the outbound interrogation transmission as is used to synchronize the Johnson counters in the digital control logic of each of the transmitters.

A zero-crossing detector 46 produces a pulse on each zero-crossing of the voltage wave. Each pulse from the zero-crossing detector resets a delay counter 48. Thereafter counting into this delay counter continues until the most significant bit becomes a "one" at which time a pulse is produced in a "one-shot" 50 which establishes the beginning of each integration period. This delay between the zero-crossing and the onset of the succeeding integration period must be highly reproducible from one cycle to the next.

The "one-shot" from the delay counter presets an interval counter 52. Thereafter counting into the interval counter proceeds until the most significant bit becomes a "one". While the most significant bit of the interval counter remains "zero" the integrator 54 integrates. The duration of this integration period must be highly reproducible from one cycle to the next. The sense of the integration is determined by the state of the second bit of a two-stage binary counter 56 which counts on the signal generated by the "one-shot" at the output of the delay counter. This two-stage counter is preset appropriately for detection of signaling depicted in FIGS. 1C or 2C by the same second level synchronizing signal that resets the divide-by-sixteen counter.

Those skilled in the art will recognize the need for insuring that the state of the second stage of this two-stage counter is established before the interval counter is preset in order to avoid a transient integration period in the improper sense; there is, of course, no difficulty in insuring that this necessary condition is satisfied.

On overflow of the divide-by-sixteen counter, the signal level accumulated within the integrator is compared in comparator 58 with reference signals that define a threshold. This comparison in initiated by a pulse generated by a "one-shot" 60 at the output of the divide-by-sixteen counter and a "one" or a "zero" is acknowledged whenever this comparison indicates that the signal accumulated within the integrator lies outside the noise window in the positive or negative sense respectively.

Once the comparison has been accomplished the integrator is cleared in preparation for the next integration. This is initiated by a delayed signal derived from "one-shot" 60 through a delay circuit 62.

DISCUSSION OF THE DETECTION ALGORITHM

Having outlined the conceptual elements of the communication system it is appropriate that particular attention be given to the detection algorithms, for it is upon this that the success of this communication scheme rests.

A requirement for precise detection stems from the fact that the signal current is superimposed on the normal phase current. Although signaling occurs at peak power levels of the order of 10 kW, these signals are imposed on a current wave that may comprise the load current corresponding to 20 MW on three phases. Clearly one must employ a detection scheme that accumulates signal and at the same time rejects contributions attributable to normal phase current supplying electrical loads on the utility system. The detection scheme of the present invention accomplishes this object. The sense of the integration chosen for the detection algorithm is such that the signal accumulated within integrator 54 during the first half-cycle is largely cancelled during the next half-cycle—this is a direct consequence of the fact that most of the phase current is attributable to the electrical loads being supplied by the utility and the current waveform has reasonable symmetry. The dynamic range requirements on the integrator are considerably reduced by this approximate cancellation, a consideration which appreciably reduces the problem of developing high precision circuitry. The dynamic range of the integrator is also reduced by employing integration intervals that are a small fraction of a half period of the line frequency; this is realized in signaling conforming to patterns depicted in FIGS. 1A and 2C with the detection algorithms there shown.

While the effects of integration over successive half-cycles tend to cancel so far as the total accumulated signal in the integrator is concerned, this cancellation cannot be expected to be exact since the current waveform in one polarity cannot be expected to be an exact mirror image of that a half a cycle earlier. It must be noted, however, that in the second cycle of each pair of cycles to which the detection algorithms are applied, the integration is in the opposite sense to that in the first cycle. Consequently at the end of this second cycle the contributions of normal phase current in the two half-sinusoids of positive polarity will have exactly cancelled and the contributions of normal phase current in the two half-sinusoids of negative polarity will have exactly cancelled provided only that the waveform of the normal phase current is repetitive from cycle to cycle. This conclusion is valid irrespective of the shape of the wave provided only that it is periodic at the power line frequency (or harmonics and some subharmonics thereof for the preferred detection algorithm). One can recognize at this point the advantage in choosing the pair of cycles that are to be compared to be adjacent cycles, as in FIGS. 1C and 2C since only in this case can the same integrator serve the entire succession of pairs of cycles (assuming a replication of the FIGS. 1C and 2C patterns).

In extracting the intelligence from the composite wave comprised of the signal current superimposed on the coexisting phase current that supplies the loads on the system, the detection algorithms compare specific regions of one cycle with the corresponding regions of a neighboring cycle in such a manner that the signal builds up while the background current attributable to steady loading contributes negligibly.

It should be noted that this approach to detection stands in marked contrast to other detection means that have been proposed for detecting current modulation—detection approach employed in this invention is capable of operating at bit rates of at least half the line frequency. Given the fact that, in the example of the preferred embodiment under discussion here, the two cycle bit pattern is repeated four times, eight cycles are assigned to each bit as a compromise trade-off between signal level and bit rate.

In order that the contribution of the line frequency and harmonics thereof may exactly cancel it is of course necessary to insure that the cancelling intervals are accurately of the same duration and relative position in the cycle. This can be accomplished by counting the output from a high frequency clock. It should be noted, however, that this clock need only exhibit good short time stability since in FIGS. 1C and 2C the comparison is being made on the basis of one cycle to the next.

If the outbound signaling distorts the zero-crossings of the power line voltage wave in a pattern known at the inbound receiver, then the pair of comparisons affected can be suppressed or compensated for in the inbound detection algorithm to achieve inbound transparency. An outbound signaling scheme which distorts the zero-crossings of the power line voltage wave in order to communicate in an outbound direction is disclosed in U.S. patent application Ser. No. 590,941.

The principal source of noise that cannot be cancelled out by perfect application of the detection algorithm is associated with the switching of loads on the distribution system. The detection system has been designed to recognize signal currents in the presence of much larger transient peak currents associated with load switching. This is achieved in part by imposing the signaling load relatively late in the half-sinusoid of the voltage wave as in FIG. 1C.

Silicon controlled rectifiers are the least costly and most satisfactory means currently available for switching the signaling loads. Once these are triggered conduction will continue until the current vanishes. For resistive loading this occurs when the voltage wave goes to zero. Thus at present the only practical means for achieving signals of brief duration (such as is required for the signaling depicted in FIG. 1C) is to trigger the silicon controlled rectifiers late in the half-sinusoid of the voltage wave. The current pulse generated in such signaling is essentially triangular, falling to zero with increasing time.

The accumulation of signal in the integrator is directly proportional to the duration of the detection algorithm. However, the switching action of most loads on a distribution system (e.g. motors, resistive heaters, etc.) is random. Thus increasing the duration of the detection algorithm increases the signal-to-noise ratio. A detection algorithm of 8 cycles of the 60 Hz is the preferred duration.

Optimum window width and location is dependent upon the type of current transients that contribute to the noise (i.e. capactive, resistive inductive), the effect of power factor correcting capacitors on the leading edge of the signal current, and those power line characteristics which cause a phase shift in the voltage at the remote transmitter relative to the reference voltage at the detector.

For example, with resistive loads the current due to normal operation will match the current pulse of the transmitter after the SCR's have been fired, falling to zero at the voltage zero. However, as the power factor decreases from unity (due to reactive load components) the current will no longer be zero at the voltage zero and for any given r.m.s. value the effective magnitude of the current in the presence of the signal current during the integration window can be greater and the signal-to-noise ratio can be reduced. The signal-to-noise ratio may then be improved by reducing the period of the integration window to coincice with the peak of the signal current.

Such a conclusion is an oversimplification of the relatively complex considerations that bear on the efficiency of detection. The complexity arises from the fact that the waveform of the triangular signaling wave is not maintained throughout the distribution system. The impedance of the feeder and the leakage reactance of distribution transformer tend to reduce the rate of rise of the signal and to introduce phase shift. When there are capacitor banks connected on the distribution system near the point where the signaling load is located these capacitors tend to provide the current needed during the rising edge of the signal current.

The most practical means of dealing with an actual distribution system where transmitters may be located at various points throughout its length, and where capacitor banks are switched as required, is realized by providing a plurality of detectors with independent integration windows. When this practice is adopted the most appropriate data from all related detectors is further processed for information content.

In summary it may be stated that for many reasons one should employ a signaling interval as short as is practical. This will in the case of the signaling depicted in FIG. 1C permit a higher power level during the signaling interval without exceeding the permissible dissipation limits of the signaling load and of the silicon controlled rectifiers. One feature of importance in using relatively short signaling intervals is the ability to exploit the high current capability of silicon controlled rectifiers of modest cost—this aspect permits very high signal levels to be generated using low cost components. However, a limit on the extent to which signal recovery may be improved by concentrating the signal into a brief interval is set by the characteristics of the distribution feeder.

DETECTION IN THE NEUTRAL

Most distribution feeders are connected in wye configuration; in this case the signal current will appear in the neutral as well as in the phase. One advantage that is achieved by detecting in the neutral is a reduction in the dynamic range requirements on the integrator, since with well balanced loads the amplitude of the neutral current is expected to be small and hence signal currents are a much larger proportion of the total currents.

It should be appreciated that without departing from the spirit and teaching of this invention the term "neutral current" can be substituted for the term "phase current" in the various embodiments. Accordingly, "phase current" as used herein shall be construed to include neutral current. Either or both terms as used herein are included in the general term "line current".

Furthermore, it is possible to detect in the neutral three simultaneous transmissions, one in each phase, of the type shown in FIGS. 1C (or of 1A or 1B).

NONINTERFERING SIGNALS

If the detection algorithm indicated in FIG. 2C is applied to the signal waveform of FIG. 1C no signal will be detected since the intervals of integration lie totally outside the intervals where the signals are generated. It is true that the characteristics of the feeder will cause the signal pulse to be distorted, but the interval of integration applicable to FIG. 2C can be chosen sufficiently beyond the zero-crossing that no signal will be sensed as a consequence of signaling in the fashion prescribed in FIG. 1C.

Likewise if the detection algorithm applicable to FIG. 1C is applied to the signal of FIG. 2C no net signal will be accumulated in the integrator. In this case the signal is present throughout the period of integration in all periods and its contribution cancels by the end of the detection algorithm.

Thus the signal patterns of FIGS. 1C and 2C are examples of totally noninterfering signals and the two means of inbound signaling can be used simultaneously.

ALTERNATIVE MEANS OF UNSCHEDULED SIGNALING

The primary use of the two transparent signaling means is that of permitting unscheduled messages to be transmitted during periods when scheduled transmissions are in progress. Other alternative means for accomplishing this objective have been considered and are here summarized.

In FIGS. 1C and 2C the pairs of cycles that are to be compared are shown as succeeding cycles and it is implied that successive bits of the scheduled inbound message will appear in immediate succession. One can however, arrange that the format of a fixed-length scheduled message has a predetermined gap in which no scheduled message is transmitted. In this case it is possible to transmit unscheduled messages during the gap and employ the same detecting equipment for receiving both scheduled and unscheduled messages provided the scheduled and unscheduled messages have the same second level synchronization.

The principal disadvantage of this scheme is that the time taken for the scheduled transmissions will be increased and the time required to accomplish each inbound unscheduled transmission will be longer than ideal.

However, if one detects in the phases but does not employ simultaneous scheduled transmissions in the different phases then there remains the option of transmitting unscheduled messages from points served by three phase power by the simple expedient of implementing on all three phases simultaneous transmissions of the type depicted in FIG. 1C. In this case an identical message will be received on the two phases where no scheduled traffic exists and a garbled message will result in the other phase. This can permit the unscheduled message to be recognized using only the receiving equipment intended for the reception of scheduled messages, but the scheduled transmission occurring at that time will be lost.

USE OF THREE PHASES IN GATHERING INFORMATION

If within the distribution feeder one does not employ simultaneous transmissions on the phases then the three phases (at subtransmission level) can be employed simultaneously in consolidation of data from distribution substations to more central substations in the subtransmission system. In particular, if a substation in the subtransmission system serves three distribution substations then the data coming into each distribution substation can be simply copied and gathered at the subtransmission substation. In this case one phase is allocated as the transmission channel for each distribution substation and simultaneous relaying of data can occur.

ESTABLISHING THE TRANSMISSION ENABLE FOR GROUP SEQUENTIAL TRANSMISSION

Various mechanisms for establishing the "transmission enable" that will determine when each transmitter is to transmit in the case of a requested sequential response will be obvious to those skilled in the art. The following approach is one possible way of implementing the mechanisms.

The outbound message that initiates the sequential transmissions specifies the numerical address of the site which is to initiate the transmission sequence. This address is entered in a counter at each transmitter that is required to respond and the count in that counter is then incremented at regular intervals corresponding to a predetermined duration. The count in the counter is compared with the numerical address of each transmitter after each time the count is incremented. When the count in the counter coincides with the address of a particular site then that site will initiate its transmission. By this simple expedient it is possible to arrange for the successive transmissions from a number of sequentially numbered sites. If a site bearing a particular number is removed from the addressed population (e.g. by transfer to another feeder) then a gap will occur in a transmission sequence programmed in this fashion.

When sequential transmissions have been initiated and power is subsequently lost at a site which is scheduled to make a transmission in the sequence, then it is desirable that the ability to transmit be inhibited at sites where power is lost in order that overlapping transmissions be avoided.

AVOIDANCE OF FLICKER

The imposition of a resistive load at the customer site will, because of the internal impedance of the transformer and that of the line result in a drop in supply voltage to the customer. Such drop in supply voltage may result in flicker in incandescent lighting and in jitter on television displays.

The loading pattern depicted in FIG. 1C tends to minimize these flicker problems. The jitter of television displays is eliminated provided that the loading does not reduce the peak voltage; by impressing the resistive load late in the half-cycle (i.e. past the peak) of the voltage wave the peak amplitude is not disturbed.

By confining the current signaling to intervals late in the half-cycle of the power line voltage sinusoid e.g. 145° given an 8 amp SCR, the voltage is undisturbed throughout most of the cycle, and particularly the voltage is undisturbed in regions where the voltage is high. As a consequence the resistive heating of an incandescent lamp, whose brightness is proportional to a high exponent of the voltage, is little affected by loading late in the half-sinusoid of voltage; accordingly, insignificant flicker results from the imposition of low impedance loads late in the half-sinusoid. If greater signaling currents are drawn, the currents should occur later in the power line voltage wave in order to prevent interference with the customer loads.

It is however, possible to impress low impedance loads, by means of silicon controlled rectifiers, in order to sustain the loading for a full half period of 60 Hz without producing flicker provided the load is reactive. In the case of a capacitor, the capacitor should be in a precharged state when it is connected to the voltage at the peak of the voltage curve. FIG. 3B depicts in block form the circuitry for precharging the capacitor. Since the voltage on the capacitor coincides with the voltage on the line at the time it is applied no current is drawn immediately. As the line voltage declines the voltage on the capacitor also declines which requires a flow of current that reaches its maximum rate at a voltage zero; the current continues to flow until at the opposite voltage maximum the capacitor is fully charged in the opposite sense. At this time the silicon controlled rectifier ceases to conduct and the loading is removed, leaving the capacitor charged in the sense which is appropriate to its use in the next signaling operation. This type of loading will leave the peak voltage unaltered and will produce relatively little flicker since the high current drain occurs near zero voltage when little heating occurs in the incandescent lamp. Note that this type of signaling does not result in energy dissipation and may also be implemented by using an inductor in place of the capacitor.

SECOND LEVEL SYNCHRONIZATION DERIVED FROM THE SIGNALING PATTERN

In the preceding discussion the second level synchronization which is used to distinguish between "ones" and "zeros" is accomplished by means external to this invention. There exists, however, the possibility of realizing the necessary second level synchronization by means of the signaling pattern per se. This permits the generation of "flags" for the implementation of unitary coding or of patterns for binary, ternary or higher coder schemes.

In this instance a plurality of receivers is installed to accommodate all possible starts for the inbound signal. The pattern employed to represent a "flag" is then so structured that the signal will build up in only the receiver which is provided with the proper second level synchronization with respect to the transmitted pattern. In those receiver detectors that do not have this proper second level synchronization, the signal accumulated in the execution of the detection algorithms lies within the range below the detection threshold.

There are a variety of options open in implementing such a self-synchronizing scheme. The signal pattern depicted in FIG. 7A is representative of an acceptable approach. This flag can conveniently be viewed as pulses occurring on the half-cycles identified with the indicated numbers; these pulses are viewed as being positive in the odd numbered half-cycles where the curve lies above the axis and negative in the even numbered half-cycles.

FIG. 7B adopts this convention in the designation of this flag pattern (which is there designated as the short flag). The various possible starts for the detectors are displayed below this designation of the flag with the detection algorithms that each will execute. All signaling aparati are connected to the feeder in such polarity that the initial loading pulse invariably results in a current pulse of the same polarity on any specified phase. This is easily achieved by means known to those in the art and extend to the present invention.

The signal level accumulated by the various detectors is indicated for each of the three cycles of the detection algorithm. The execution of the detection algorithm again involves the comparison of corresponding portions of half-cycle pairs; for the flag pattern depicted in FIG. 7A a satisfactory basis for such comparison would be 1 vs 3; 2 vs 4; 5 vs 7; 6 vs 8 etc. This signal level is simply the sum that results on adding or subtracting 1 according as the sign designating the sense of integration and the sign of the pulse are the same or opposite respectively.

It will be observed that in sensing this short flag the detecotr that has the correct second level synchronism accumulates to +4 on two successive detection cycles—this is to be contrasted with the case of detectors that do not have the correct second level synchronism where the sums tend to be negative, and when positive the signal level is only +1, and this occurs on only one cycle of the detection algorithm for any detector.

The high contrast between the performance of the detector that has the correct second level synchronization and the other detectors permits one to establish an identifiable feature of this flag, thereby permitting a specific cycle of the train of cycles of the voltage wave to be assigned a unique identity. Such identification can be employed to transmit information in unitary code or other more efficient codes.

One can likewise use the fact that the recognition of successive flags can be made to occur in a particular pattern of receivers as a means of implementing codes to bases other than unity—those skilled in the art will recognize that the possible variations are myriad.

Perhaps less obvious are the options that are open in terms of various flag patterns that can be recognized and brought into high contrast second level synchronism by the same detection equipment. An example of another flag pattern that is compatible with the detection equipment used to search for the short flag produced by loading on cycles 1, 4, 6, 9, 13, 16, 18 and 21 (of FIG. 7A) is the pattern generated by loading on cycles 1, 4, 6, 9, 21, 24, 26 and 29. This latter pattern is designated as the "long flag" in FIG. 7B; the detection of a "long flag" is acknowledged if a half-flag is detected in one channel subsequent to the detection of the other half-flag in the channel which is second level synchronized to a time four cycles of 60 Hz earlier.

COMPATABILITY WITH NORMAL USE OF POWER LINES

It should be noted that the transmission of digital information over the power lines by the preferred embodiments described in no way compromises the originally intended simultaneous use of the distribution system. It will now be apparent to those skilled in the art that numerous modifications, adaptations and alternative implementations of this new communication technology can be made without departing from the scope and teaching of this invention. For example, although the invention has been described in terms of electric power lines, it will be appreciated that the basic current signaling concepts can be applied to other lines, carrying an alternating voltage.

What we claim and desire to secure by Letters Patent of the United States is:

1. A method of transmitting intelligence in a direction from load to source over an electric power line having a voltage wave thereon and supplying current to at least one load, said method comprising the steps of:
    (1) adding to the load current on the line recognizable pattern of signaling currents in synchronism with the power line voltage wave, said pattern of signaling currents representing at least a portion of the intelligence to be transmitted;
    (2) sensing the line current comprising the combined load and signaling currents on the line and generating in response thereto a corresponding pattern of signals having a characteristic which is a function of the sensed line current; and,
    (3) extracting the transmitted intelligence from the sensed line current by processing said corresponding pattern of signals in accordance with an algorithm which commences in synchronism with the pattern of signaling currents and which operates on the sensed line current in opposite senses at different positions along the voltage wave with the sense at any one of said positions being determined by the synchronism and with each element of intelligence in the pattern of signaling currents being inferred from the polarity of the signal resulting from said processing.

2. An apparatus for transmitting intelligence in a direction from load to source over an electric power line having a voltage wave thereon and supplying current to at least one load said apparatus comprising:
    (1) means for adding to the load current on the line a recognizable pattern of signaling currents in synchronism with the power line voltage wave, said pattern of signaling currents representing at least a portion of the intelligence to be transmitted;
    (2) means for sensing the line current comprising the combined load and signaling currents on the line and generating in response thereto a corresponding pattern of signals having a characteristic which is a function of the sensed line current; and,
    (3) means for extracting the transmitted intelligence from the sensed line current, said means for extracting the intelligence including means for processing said corresponding pattern of signals in accordance with an algorithm which commences in synchronism with the pattern of signaling currents and which operates on the sensed line current in opposite senses at different positions along the voltage wave with the sense at any one of said positions being determined by the synchronism and with each element of intelligence in the pattern of signaling currents being inferred from the polarity of the signal resulting from said processing.

3. A method for transmitting binary intelligence over an energized, AC power line having at least one load thereon in the direction from load-to-source wherein, by prior arrangement, a transmitter and a receiver recognize the two cycles of the power line voltage sinusoid that define the pair of cycles used in the representation of each bit of intelligence, and wherein each bit of intelligence is represented in the form of discernible difference between samplings of current effected by integrating the current throughout corresponding intervals in each cycle of the compared pair with the sign of the difference denoting the one/zero value of the binary bit, said method comprising the steps of:
 (1) drawing signal current from the energized power line at a transmitting site to produce a signal waveform which is the same in the two cycles of the pair except within corresponding intervals contained within at least one preselected quadrant of the power line voltage sinusoid where the signal current is drawn for each such corresponding interval for only one of the pair of cycles;
 (2) integrating at a receiving site the total line current comprising the pre-existing load current and the signal current superimposed thereon throughout corresponding intervals in the pair of cycles to produce at least one set of integrated current samples;
 (3) determining the difference between the integrated current samples in said at least one set of integrated current samples for the pair of cycles; and,
 (4) determining the sign of the difference, said sign denoting the binary value of the bit.

4. The method of claim 3, wherein the signal current is drawn at the transmitter site throughout a plurality of sets of corresponding intervals, said method further comprising the steps of:
 (1) integrating at the receiving site the total line current comprising the pre-existing load current and the signal current superimposed thereon throughout each set of corresponding intervals to produce corresponding sets of integrated current samples;
 (2) determining the difference between the integrated current samples in each such set of integrated current samples;
 (3) combining in an algebraic sense the differences so determined to produce an augmented difference signal; and,
 (4) determining the sign of said augmented difference signal, said sign denoting the binary value of the bit.

5. The method of claim 3 further comprising the step of drawing said signal current in response to an interrogation signal, said interrogation signal establishing the two cycles of the power line sinusoid that define the pair of cycles used in the representation of each bit of intelligence.

6. The method of claim 3 wherein the two cycles of the power line voltage sinusoid that define each pair of cycles used in the representation of each bit of intelligence are adjacent cycles.

7. The method of claim 3 further comprising the step of establishing the pair of cycles that represent each bit of intelligence in response to a preamble to said at least one set of integrated current samples, said preamble functioning only to achieve such synchronization.

8. The method of claim 3 further comprising the steps of:
 (1) replicating the signal pattern of successive adjacent pairs of cycles to produce a pattern corresponding to a succession of identical bits; and,
 (2) accumulating the integrated current sample differences over the succession of identical bits whereby a signal of enhanced strength is produced.

9. The method of claim 3 further comprising the steps of:
 (1) drawing the signal current within a period contained in the second quadrant of the local power line voltage sinusoid for one cycle of the pair of cycles and not drawing the signal current in the corresponding period for the other cycle; and,
 (2) drawing the signal current within a period contained in the fourth quadrant of the local power line voltage sinusoid for one cycle of the pair of cycles and not drawing the signal current in the corresponding period for the other cycle of the pair of cycles.

10. The method of claim 3 wherein signal current is drawn throughout the entirety of both cycles of the pair except that for one of the cycles no signal current is drawn in a period early in the first quadrant of the local power line voltage sinusoid and for one of the cycles no current is drawn in a period early in the third quadrant of the local power line voltage sinusoid.

11. The method as claimed in any of the claims 3 through 10 wherein the signal current is drawn by impressing at least a resistive signaling load.

12. The method as claimed in any of the claims 3 through 10 wherein the signal current is drawn by impressing at least an inductive signaling load.

13. The method as claimed in any of the claims 3 through 10 wherein the signal current is drawn by impressing at least a capacitive signaling load.

14. The method of claim 13 where the capacitive signaling load is impressed in a precharged condition.

15. The method of claim 14 where the capacitive signaling load is precharged to a voltage corresponding to the peak voltage of the power line voltage sinusoid and is impressed at the peak voltage of said power line voltage sinusoid and remains impressed for an integer number of half periods.

16. A method as claimed in any of claims 3 through 8 wherein the signal current is drawn sufficiently past the crest of the local power line voltage sinusoid as to prevent interference with the various loads served at said transmitting site.

17. The method of claim 5 wherein a preamble to the message proper is transmitted and a multiplicity of receivers, which are temporally displaced but are otherwise identical, are employed in the detection of the preamble, the pattern of the preamble and the manner in which the differences in the integrated signals are accumulated within the temporally displaced receivers being such that in one and only one of the receivers will a large signal accumulate from the preamble, and in all other receivers the accumulated signal will lie below an acceptance threshold.

18. An apparatus for transmitting binary intelligence over an energized, AC power line having at least one load thereon in the direction from load-to-source wherein, by prior arrangement, a transmitter and a receiver recognize the two cycles of the power line voltage sinusoid that define the pair of cycles used in the representation of each bit of intelligence, and wherein each bit of intelligence is represented in the form of discernible difference between samplings of current effected by integrating the current throughout corresponding intervals in each cycle of the compared pair with the sign of the difference denoting the one/zero value of the binary bit, said apparatus comprising:

(1) means for drawing signal current from the energized power line at a transmitting site to produce a signal waveform which is the same in the two cycles of the pair except within corresponding intervals contained within at least one preselected quadrant of the power line voltage sinusoid where the signal current is drawn for each such corresponding interval for only one of the pair of cycles;

(2) means for integrating at a receiving site the total line current comprising the pre-existing load current and the signal current superimposed thereon throughout corresponding intervals in the pair of cycles to produce at least one set of integrated current samples;

(3) means for determining the difference between the integrated current samples in said at least one set of integrated current samples for the pair of cycles; and, (4) means for determing the sign of the difference, said sign denoting the binary value of the bit.

19. The apparatus of claim 3 wherein the signal current is drawn at the transmitter site throughout a plurality of sets of corresponding intervals, said apparatus further comprising:

(1) means for integrating at the receiving site the totoal line current comprising the pre-existing load current and the signal current superimposed thereon throughout each set of corresponding intervals to produce corresponding sets of integrated current samples;

(2) means for determining the difference between the integrated current samples in each such set of integrated current samples;

(3) means for combining in an algebraic sense the differences so determined to produce an augmented difference signal; and, (4) means for determining the sign of said augmented difference signal, said sign denoting the binary value of the bit.

* * * * *

UNITED STATES PATENT AND TRADEMARK OFFICE
CERTIFICATE OF CORRECTION

PATENT NO. : 4,400,688

DATED : August 23, 1983

INVENTOR(S) : REED H. JOHNSTON, et al

It is certified that error appears in the above-identified patent and that said Letters Patent are hereby corrected as shown below:

Column 4, line 63, delete "temporarily" and insert therefor --temporally--;

Column 7, line 19-20, delete "out-board" and insert therefor --outbound--;

Column 8, line 7, delete "outboard" and insert therefor --outbound--;

Column 11, line 31, delete "coincice" and insert therefor --coincide--;

Column 14, line 59, delete "coder" and insert therefor --coding--;

Column 20, line 10, delete "totoal" and insert therefor --total--.

Signed and Sealed this

Twenty-second Day of May 1984

[SEAL]

Attest:

GERALD J. MOSSINGHOFF

Attesting Officer — Commissioner of Patents and Trademarks